United States Patent [19]

Braitinger et al.

[11] Patent Number: 4,651,273
[45] Date of Patent: Mar. 17, 1987

[54] PRESSURE CONTROL INSTALLATION FOR PRESSES

[75] Inventors: Helmut Braitinger; Otto Feinauer, both of Goeppingen, Fed. Rep. of Germany

[73] Assignee: L. Schuler GmbH, Fed. Rep. of Germany

[21] Appl. No.: 696,635

[22] Filed: Jan. 30, 1985

[30] Foreign Application Priority Data

Feb. 3, 1984 [EP] European Pat. Off. ........ 84101087.9

[51] Int. Cl.[4] .............................................. G06F 9/06
[52] U.S. Cl. .................................... 364/188; 364/476; 72/446
[58] Field of Search ............... 364/188, 472, 475, 476; 72/446, 448

[56] References Cited

U.S. PATENT DOCUMENTS 4,314,354  2/1982  Felder et al. ..................... 364/900
4,517,649  5/1985  Kitagawa ........................ 364/475

Primary Examiner—Jerry Smith
Assistant Examiner—Allen MacDonald
Attorney, Agent, or Firm—Barnes & Thornburg

[57] ABSTRACT

A pressure control installation for presses in which the individual pressure consuming stations are to be actuated with different pressures. During the setting up of the presses, it is necessary to fetch and display visible for the operator values adjusted during the optimization and interim value. The pressure control units, whose number depends on the number of differing high pressures, are connected by way of an interface component to a stored programmable cotnrol SPS. The read-out of the data in the pressure control unit takes place by way of a read-out key whereby a routine is initiated it the SPS during the actuation of the read-out key for the guidance of the operator.

10 Claims, 3 Drawing Figures

PRESSURE CONTROL INSTALLATION FOR PRESSES

BACKGROUND AND SUMMARY OF THE INVENTION

The present invention relates to a pressure control installation for the pressure of the drawing apparatus, of the ram mass balance, of the workpiece ejection units or similar pressure loads in presses. These presses generally include pressure producing, pressure storing, and pressure sensing means; a pressure regulating unit consisting of a control unit for the pressure predetermination, of a pressure comparing device and of a valve unit for the adjustment of the necessary pressure, and memory means for storing and readying the optimized pressure values.

The individual pressure consuming stations of a press, gang press or multi-stage press as well as presses of a press line must be actuated at least in part with greatly varying high pressures. It is necessary during the installation of a press to render the values established during the optimization and interim values readable or fetchable and to display these values to the operator during interim periods.

An installation of the aforementioned type is described in the U.S. Pat. No. 3,945,230 in which variables of a press are adjusted during the change of the work tool by way of a pressure regulating installation. The pressure loads are connected to a pressure reservoir whose pressure values are regulatable by way of a comparison arrangement. A voltage-controlled pressure regulating valve unit is installed in the pressure line leading from the pressure producer to the pressure reservoir for the pressure build-up in case of excessively low pressure values and for the pressure reduction in case of excessively high pressure values in the pressure reservoir. For that purpose, the pressure in the pressure reservoir is read-out by way of a pressure sensor. The actual signal is compared in a voltage comparator element with the desired predetermination value of a pressure. The difference signal present at the valve unit as signal for the pressure formation.

The aforementioned printed publication discloses a logic arrangement, by means of which it is possible to adjust initial conditions of the press and to control the adjusted values, however, without describing in detail the logic arrangement. The press adjustment takes place automatically according to a program, once the values are set or adjusted. However, the aforementioned prior publication does not teach possibilities for matching several pressure loads to be acted upon with different pressure, the elimination of the difficulties of the press installation which occur to an increasing extent as a result thereof, the avoidance of the difficulties by a corresponding circuit structure as well as possibilities for the acceptance and re-use of the optimized values determined in the teach-in-operation.

In contradistinction thereto, it is the object of the present invention to considerably improve, for the operator, the setting-up or installing phases prior to and during the teach-in operation and to open up to the operator possibilities of a simple control of the running-in operation and the use of these data for subsequent applications. Additionally, new circuit techniques are to be used according to the present invention and new circuit components are to be used for a new setting-up or installing operation of the press.

The underlying problems are solved according to the present invention by a number of pressure regulating units required in dependence on different pressures, by a stored programmable control (SPS) for the control of the data traffic, to which the pressure regulating units are connected by way of selection circuits (interfaces), by memory means connected bus-like to the stored programmable control for the program input, the program change, and for the data storage, and by further manual numerical input means for the coded input of program-changing, pressure-changing data representing program-values, actual values as well as desired values which are adapted to be read-out and/or inputted.

According to a further feature of the present invention, the data traffic according to the present invention takes place by the addressing possibility by means of a selection circuit constructed as multiplexer for the data transfer between the regulators and the stored programmable control for the individual call-up of each individual regulator. As a result thereof, the pre-requisites for the individual call-up of each regulator and for a considerable reduction of the lines leading from the interface to the stored programmable control and to the further peripheral units are achieved.

Beyond the aimed-at and therewith reliable call-up or read-out of the actual value of the individual pressure regulating units, the present invention provides a pressure control system, by means of which the response to predetermined respectively predeterminable operating steps are realized and input errors and storage errors are avoided. This is achieved in a preferred embodiment of the present invention by a routine in the stored programmable control unit activatable, by a manually triggerable data transfer key. With an actuated data transfer key; the existing actual values from the individual pressure regulating units are individually called or fetched, and stored in memories and are transferred to the visual representation means. The operator therefore has the possibility of access and change of the data on the basis of predetermined input steps.

These and other objects, features and advantages of the present invention will become more apparent from the following description when taken in connection with the accompanying drawing which shows, for purposes of illustration only, one embodiment in accordance with the present invention, and wherein:

DETAILED DESCRIPTION OF THE DRAWINGS

Figure 1:
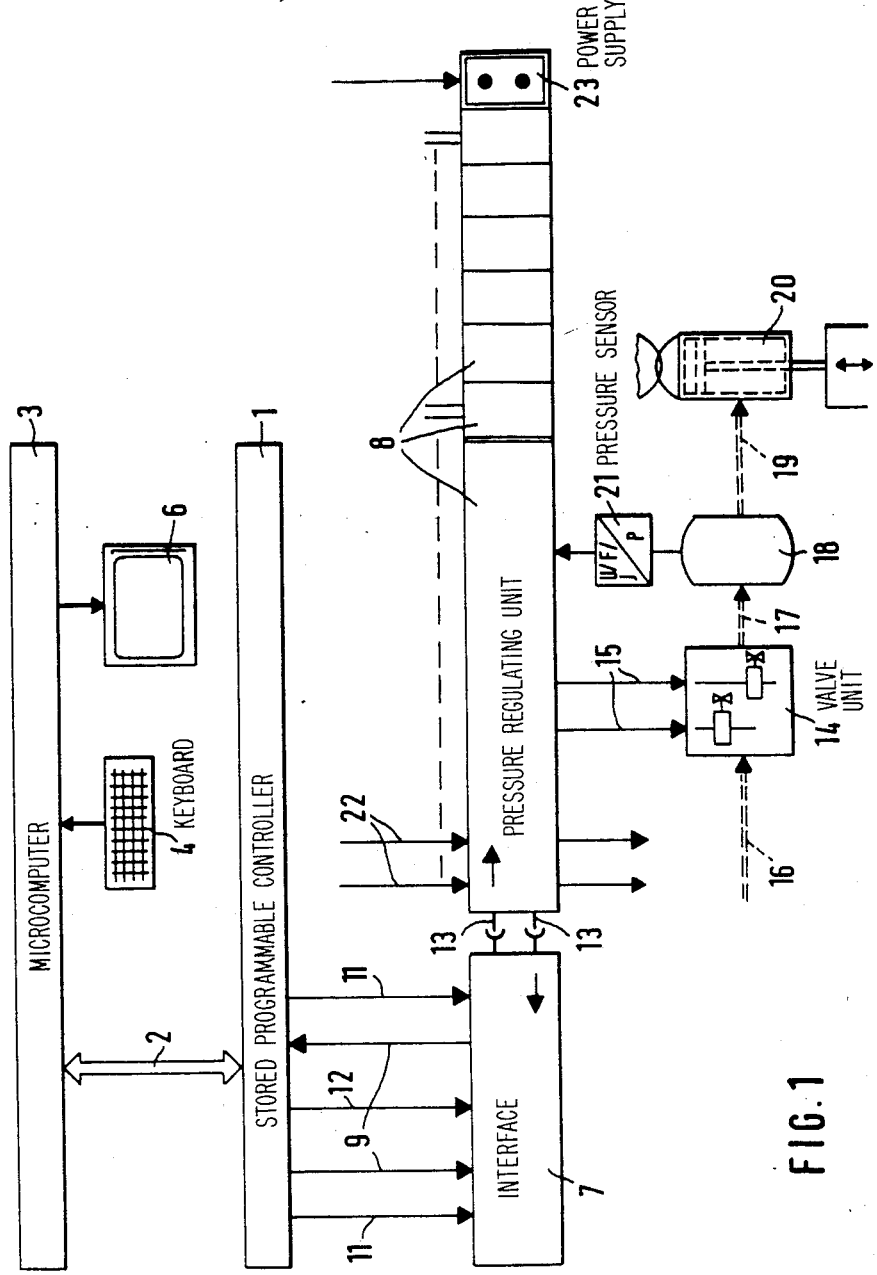
FIG. 1 is a schematic block diagram of a control system in accordance with the present invention with the peripheral components connected to the control system.

Referring now to the drawings, like reference numerals are used throughout the various views to designate corresponding parts. FIG. 1 illustrates a stored programmable control 1, hereinafter referred to as SPS, of the type of control according to the U.S. Pat. No. 4,314,354 and whose structural arrangement is illustrated more fully in FIG. 3. A microcomputer 3 whose function blocks are made of integrated semiconductor circuits and whose microprocessor units consists of memories in this case for storing text—and data-values, is connected by way of a bus line 2, to SPS 1 and is also connected to a peripheral keyboard 4 for text—and data-input and to means for the visual representation 6 of data and text (monitor). For example, seven pressure regulating units 8 are connected by way of an interface 7 to the SPS 1, which may have the structural arrangement according to FIG. 2. The connections for a data traffic between the pressure regulating units 8 and the SPS 1 takes place between the SPS 1 and the interface 7 by means of data bus 9, address bus 11 and control bus 12 and between the interface 7 and the regulators 8 by way of a plurality of lines 13.

The number of lines 13 is given by the necessity to transmit desired values from the keyboard 4 to the pressure regulating units 8 and actual values from the latter to the SPS 1 and by way of the SPS 1 to the microcomputer 3. The lines 13 are also composed of data lines, address lines and control lines. One voltage-controlled, pressure-regulating valve unit 14 each is connected by way of control lines 15 to each of the pressure regulating units 8 whose number corresponds to the number of pressure loads 20. The valve unit 14 includes a pressure input 16 from a pressure producer (not shown) and a pressure output 17 to a pressure reservoir 18. One pressure load 20, or possibly several pressure loads are connected to the pressure reservoir 18 by way of a further pressure line 19. The pressure loads may be, for example, the pressure chamber of the drawing apparatus, the pressure chamber of the ram weight balance or the pressure chamber of the workpiece ejection units. The read-out of the pressure in the pressure reservoir 18 takes place in each case by way of a pressure-voltage converter, a pressure-frequency converter 21 or a pressure-current converter which is electrically connected to the associated pressure regulating unit 8. The predetermining or presetting of the pressure desired value by the manual input possibilities, keyboard 4 or keyboard 33 at the controller 26 (FIG. 2) leads to a comparison in the respectively called-up pressure regulating unit 8.

The comparison of actual and desired values may take place, conditioned by the differently acting pressure loads 20, during the conversion, for example, in dependence of the angular position of the press crank, of the flywheel or of the ram position, and more particularly during a phase in which the ram of the press and/or the draw cushion of the draw apparatus are without load respectively unstressed. For that purpose, release or command lines 22, which come from a cam control and/or the clutch control of the press, are connected to the pressure control units 8. A network or power supply part 23 is provided for the current/voltage supply of the pressure control units 8 as well as for the valve units 14 connected thereto. The monitor 6, the microcomputer 3 and the stored programmable control 1 include their own proper supplies in an also known manner.

Figure 2:
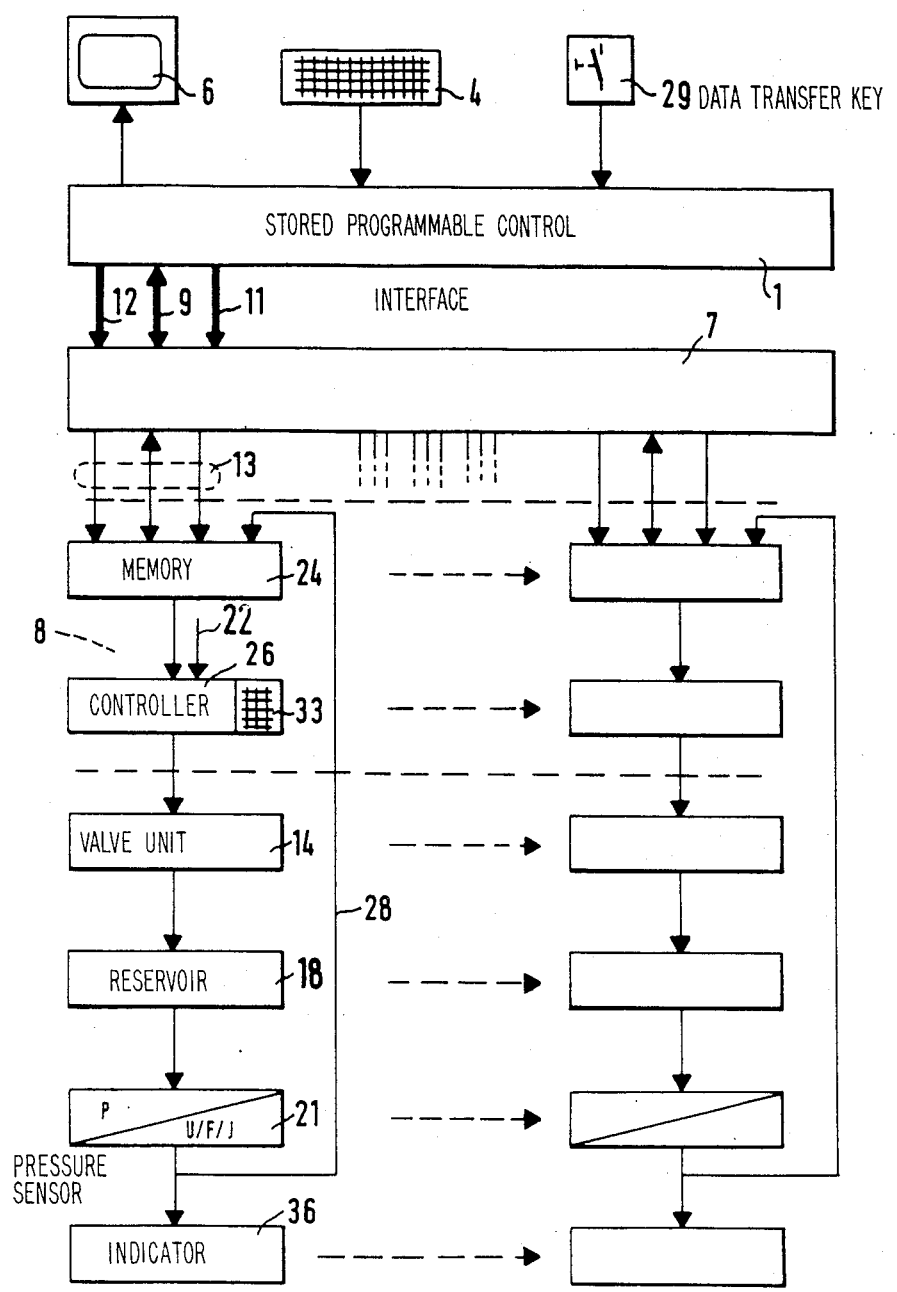
FIG. 2 is a schematic diagram illustrating the structural arrangement of the pressure regulating units of the circuit according to FIG. 1.

FIG. 2 illustrates the structural arrangement of the pressure regulating units 8 connected to the SPS 1 by way of the interface 7, for example, a multiplexer. The pressure control units 8 include essentially a memory 24 for the interim storage of desired and actual values which are compared in the memory 24 and with manual input by way of the keyboard 33 are then compared in the controller 26 when a command coming from the cam control is present in the lines 22. The comparison leads to a pressure increasing or pressure reducing signal for the valve unit 14. After execution of the pressure adjustment in the pressure reservoir 18 by way of the valve unit 14 in response to this signal, a feedback takes place by means of the pressure sensor 21 by way of the line 28 to the memory 24. The actual values stored in the memory 24 are represented as data on the monitor 6 by way of the data bus 9 after actuation of a data transfer key 29 and a corresponding addressing of the called-up pressure regulating unit 8 by way of the actual value address line 11 and the SPS 1. The desired value predetermination or presetting takes place by way of manually actuatable input keys 33 at the controller 26 to the memory 24 or as will be described more fully hereinafter by reference to FIG. 3, with a corresponding addressing of the pressure control unit 8 to be called-up, by way of the desired value address line 12 and the data traffic by way of the data bus 9 to the memory 24. The respective actual pressure values are shown in a further indicating unit 36. It can be seen from FIG. 2 that the components described by reference to FIG. 1 of the microcomputer 3 can be integrated into the SPS 1. Similarly, the possibility of the data traffic and of the addressing may take place by way of I/O components integrated into the SPS 1. The lines 13 indicated between the multiplexer 7 and each pressure control unit 8 embody a number of individual lines of the data- and address-traffic between the pressure control units 8 and the multiplexer 7.

Figure 3:
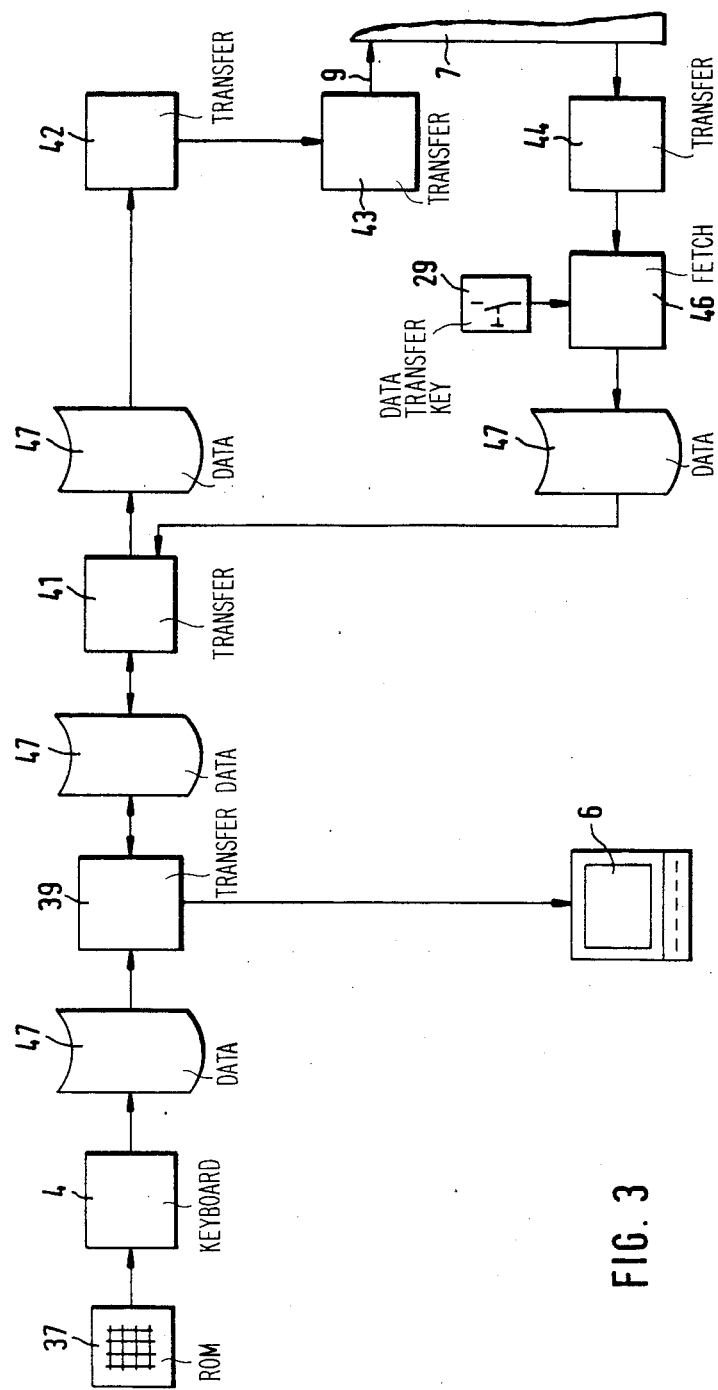
FIG. 3 is a schematic block diagram illustrating individual electronic components in their coordination for realizing the operating steps in accordance with the present invention.

The data flow between the peripheral components such as read only memory (ROM) 37, input keyboard 4, monitor 6 and interface 7 can be seen from the illustration of FIG. 3. The structural arrangement of the SPS 1 illustrates in addition to function- and transfer-components 39, 41, 42, 43, 44, 46 and 29, additionally also data components 47 in which the data of the pressure control units 8 are recorded. The function components cause the data transfer from data component to data component. The data which are present in the desired value predetermination or presetting device 4, 37 reach by way of a memory unit, work tool diagnosis 39, the monitor 6 and by way of a transfer component 41 and the transfer components 42 and 43 the data bus 9. The transfer component 41 thereby serves for the output of the desired value as well as for the acceptance of actual values present in the interface 7. It is of course understood that the data traffic, in lieu of taking place by way of the multiplexer interface 7, may take place also by way of other circuit possibilities such as, for example, I/O ports. The components 43 for the data preparation and 44 for the data feedback characterize such a measure.

During the actuation of the data transfer key 29, the actual data values present in the memory 24 (FIG. 2) for the pressure are transmitted to the data component 47 by way of the interface traffic (for example component 44) and a fetching or read-out unit 46, and are thereupon fed to the monitor 6 by way of the transfer components 41 and 39.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A pressure control installation for the pressure of pressure loads in presses, comprising;

pressure producing means, pressure storing means connected to said pressure producing means, pressure sensing means connected to said pressure storing means, pressure regulating means including predetermined means for providing a predetermed value of pressure, pressure comparing means connected to said sensing means and said predetermined means and valve means connected to said pressure storing means and comparing means for adjusting the necessary pressure in the pressure storing means, first memory means connected to said pressure regulating means for storing and readying optimized pressure values, the number of pressure regulating means corresponding to the number of different pressures necessary in the pressure control installation, stored programmable control means for the control of data traffic, the pressure regulating means being operatively connected to said stored programmable control means by way of selecting circuit means, second memory means for the program recording, program change and data storage, bus means operatively connecting the second memory means with the selection circuit means, and manual numerical input means connected to said stored programmable control means for the coded input of program-changing, pressure-changing data representing program values, actual values and desired values and operable to be inputted or outputted.

2. An installation according to claim 1, wherein the selection circuit means includes interface means.

3. An installation according to claim 2, wherein said selection circuit means includes multiplexer means for the data transfer between the pressure regulating means and the stored programmable control means for the individual call-up of each individual pressure regulating means.

4. An installation according to claim 3, further comprising:

means connected to said stored programmable control means for the visual representation of data and text, a manually actuatable data transfer key connected to said stored programmable control means within easy access of the operator, and a routine in said second memory means operable to be activated by the stored programmable control means in response to an actuated data transfer key whereby the existing actual values are transferred from the individual pressure control means to the second memory means and rendered visible by means of visual representation means.

5. An installation according to claim 4 including visual display means connected to said sensing means.

6. An installation according to claim 4, including state sensing means for sensing a predetermined state of a pressure load connected to said pressure storing means and wherein said pressure comparing means is activated by said state sensing means.

7. An installation according to claim 1, wherein said selection circuit means includes multiplexer means for the data transfer between the pressure regulating means and the stored programmable control means for the individual call-up of each individual pressure regulating means.

8. An installation according to claim 1, further comprising:

means connected to said stored programmable control means for the visual representation of data and text, a manually actuatable data transfer key connected to said stored programmable control means within easy access of the operator, and a routine in said second memory means operable to be activated by the stored programmable control means in response to an actuated data transfer key whereby the existing actual values are transferred from the individual pressure control means to the second memory means and rendered visible by means of visual representation means.

9. An installation according to claim 1 including visual display means connected to said sensing means.

10. An installation according to claim 1, including state sensing means for sensing a predetermined state of a pressure load connected to said pressure storing means and wherein said pressure comparing means is activated by said state sensing means.

* * * * *